March 3, 1964 R. L. WARD 3,123,808

MAGNETIC STORAGE DEVICE

Filed July 16, 1958 4 Sheets-Sheet 1

*INVENTOR.*
ROBERT L. WARD
*BY*
William V. Schelberg
AGENT

March 3, 1964 R. L. WARD 3,123,808

MAGNETIC STORAGE DEVICE

Filed July 16, 1958 4 Sheets-Sheet 4

United States Patent Office 3,123,808

Patented Mar. 3, 1964

3,123,808
MAGNETIC STORAGE DEVICE

Robert L. Ward, Poughkeepsie, N.Y., assignor to International Business Machines Corporation, New York, N.Y., a corporation of New York Filed July 16, 1958, Ser. No. 748,919
12 Claims. (Cl. 340—174)

This invention relates to magnetic devices and more particularly, to magnetic devices utilized in switching circuits and memory systems.

When magnetic core components are fabricated, serious problems in manufacturing are presented due to the winding arrangements necessary for coupling components to one another in switching relationship. A magnetic core memory array is an example in which threading of windings becomes laborious and time consuming. As a consequence of these difficulties, a memory array has been fabricated in which a ferrite apertured plate is utilized having the various drive and sense lines threaded through each of the apertures making up a single storage unit. Although the ferrite apertured plate solves some problems, much is left to be desired, since some threading of the lines through the apertures is required and further, the amount of flux which may be switched in this latter type magnetic memory scheme is determined by the magnitude of drive applied. The only defined magnetic flux path in the apertured plate is the portion intermediate adjacent apertures, the drive therefore, must be strictly regulated to insure minimizing of flux leakage between adjacent magnetic circuit storage cells for the unit.

To circumvent the problem of flux leakage intermediate adjacent apertures in a ferrite plate, a cluster of secondary apertures surrounding the central aperture of each cell has been envisioned so that the magnetic circuit would be defined by the area intermediate the central aperture and the secondary apertures. This latter technique, while partially confining the magnetic flux within a defined area still allows some leakage and still requires conductors threaded through the central aperture.

In accordance with the present invention, electrodes or probes are placed in direct contact with the magnetic material and flux changes may be developed in the material and changes therein may be sensed through the probes without use of winding coils. This invention solves many of the aforementioned difficulties by utilization of electrodes and probes on the magnetic material surfaces and in a ferrite plate, ring shaped electrodes are employed which provides substantially complete isolation between adjacent magnetic cells.

Accordingly, it is a broad object of this invention to provide improved means for sensing flux changes in a magnetic material.

Another object of this invention is to provide a simple structure wherein flux changes in an apertured plate of magnetic material may be sensed.

Still another object of this invention is to provide an improved means for causing flux changs in low resistivity ferrite material.

Yet another object of this invention is to provide a memory device wherein only surface electrodes are utilized for driving and/or sensing flux changes in low resistivity magnetic material.

An additional object of this invention is to provide a novel memory device utilizing a sheet of metallic magnetic material in which the flux is actively confined to an ascertainable area.

Another object of this invention is to provide a three-dimensional memory array wherein each storage cell is passively magnetically isolated from one another.

Another object of this invention is to provide, in a magnetic binary memory plane fabricated from a sheet of magnetic material, areas of increased conductivity for isolating, and avoiding flux leakage intermediate, each of the magnetic binaries.

Other objects of the invention will be pointed out in the following description and claims and illustrated in the accompanying drawings, which disclose, by way of example, the principle of the invention and the best mode, which has been contemplated, of applying that principle.

In the drawings:

FIGS. 1*a* and 1*b*; 2*a* and 2*b* illustrate one embodiment of this invention and represent top and side views, respectively, of a toroidal magnetic core.

FIGS. 3*a* and 3*b* illustrate another embodiment of this invention, representing top and side views, respectively, of a ferrite aperture plate.

FIGS. 4*a* and 4*b* illustrate another embodiment of this invention and represent top and side views, respectively, of a ferrite aperture plate.

FIG. 5*a* illustrates another embodiment of this invention and represents the side view of a toroidal tape wafer core, while FIG. 5*b* illustrates the equivalent winding configuration of the structure shown in FIG. 5*a*.

FIG. 6 illustrates another embodiment of this invention and represents the side view of a toroidal type wafer core.

FIGS. 7*a* and 7*c* illustrate still another embodiment of this invention and represent a side view of a toroidal tape wafer core, while FIGS. 7*b* and 7*d* illustrate the equivalent winding configuration of the structures shown in FIGS. 7*a* and 7*c*, respectively.

FIGS. 8*a*, 8*b*, 8*c*, 8*d*, 8*e*, and 8*f* illustrate the top and side view of tape wafer cores and their equivalent winding configuration in accordance with another embodiment of this invention.

FIGS. 9*a*, 9*b*, 9*c*, 9*d*, 9*e* and 9*f* illustrate the top and side views of tape wafer cores and their equivalent winding configurations in accordance with another embodiment of this invention.

FIGS. 10*a* and 10*b* illustrate the top and side views, respectively, of a memory cell in accordance with another embodiment of this invention.

Figure 1A:
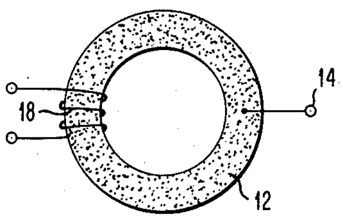
Figure 2A:
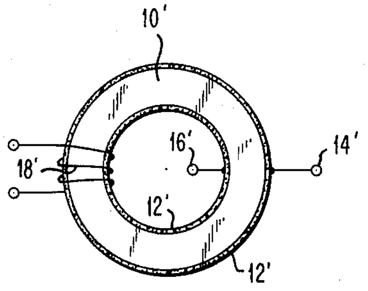
Figure 1B:
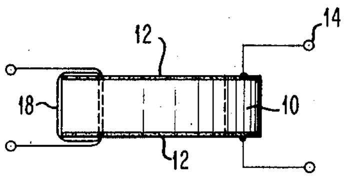
Figure 2B:
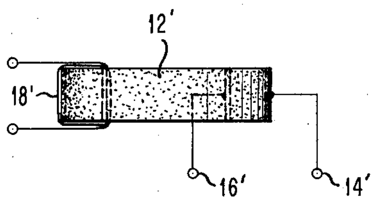
Figure 3A:
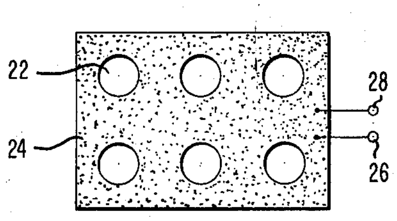
Figure 4A:
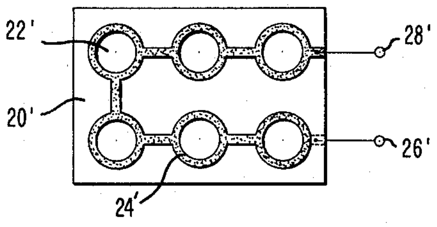
Figure 3B:
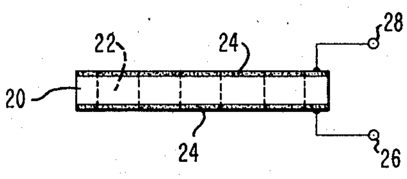
Figure 4B:
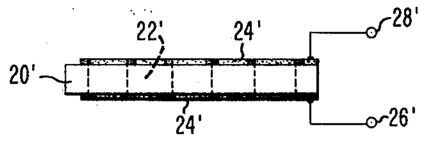
Figure 5A:
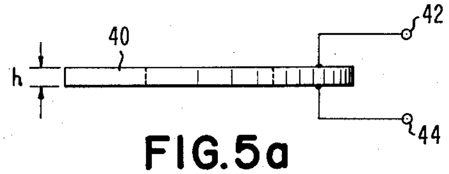
Figure 5B:
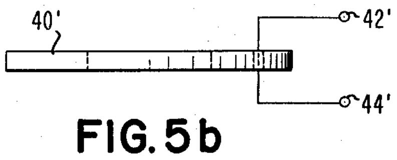

It has been found that electrodes may be utilized on magnetic structures to sense a flux change taking place within the magnetic material. As an example how electrodes may be utilized in accordance with this invention, the FIGS. 1–4 show some embodiments which are directed to sensing flux changes in toroidal magnetic cores and in an apertured plate of magnetic material. When low resistivity metallic magnetic material is utilized, not only are electrodes of utility in sensing a flux change, but may also be adapted to cause a flux change. It has been further ascertained that probes may work just as well on metallic magnetic material for sensing flux changes as is shown in the FIGS. 5–8. The hysteresis characteristic of the material may have most any configuration, but when the material is capable of attaining bistable states of flux density, the structures illustrated lend themselves to logical devices.

With reference to the FIGS. 1*a*, 1*b*, 2*a* and 2*b*, a toroidal magnetic core 10 is shown made of a magnetic material having very low resistivity electrodes 12, such as silver, which are plated or painted on opposite surfaces, a pair of probes 14 and 16 which are connected to the electrodes 12, and a signal winding 18 which links the magnetic circuit of core 10. An alternating signal, when applied to the winding 18, periodically switches the direction of magnetic flux in the core 10 from one direction to another. When a flux change occurs within the magnetic circuit defined by the core 10, a potential difference is obtained across the probes 14 and 16, the polarity of which is dependent upon the direction of flux change taking place. Since the electrodes 12 describe the entire flux path on either surface of the core 10, the total flux change is sensed, and if that change of flux which takes place within the outer half of the circuit is desired, the electrodes 12 would then cover only the outer portion of the path, i.e. be half as wide.

In order to fully comprehend how the flux change in the above structures may be sensed, one may envision numerous parallel conductors connected intermediate the electrodes 12 and a change of flux within the material as traversing each of the envisioned conductors, thus providing the potential difference across the electrodes 14 and 16. Decreasing the surface area covered by the electrodes 12, on either or both surfaces, would then decrease the number of fictional parallel conductors and thereby change the potential difference obtained across the electrodes 14 and 16.

In the FIGS. *3a, 3b, 4a* and *4b*, a sheet of magnetic material 20 is shown having a number of apertures 22 and a coating of very low resistivity electrode 24 upon which a pair of probes 26 and 28 are connected. In the embodiment shown in FIGS. *3a* and *3b* the electrodes 24 cover the sheet 20 leaving the apertures 22 exposed, while in the embodiment of FIGS. *4a* and *4b*, the electrode coatings 24' describe a defined area about each of the apertures 22' and are connected one with another. In many aperture plate memory arrays all driving and sense lines are threaded through each of the apertures, while here, only the drive lines need be threaded through the apertures 22, since in the FIGS. *3a* and *3b*, a flux change taking place within the plate 20 is sensed by the probes 26 and 28, while a flux change taking place within the plate 20' in FIGS. *4a* and *4b*, in the areas defined between electrodes 24' about the apertures 22', may be sensed by the probes 26' and 28'.

In the aforegoing description, a core made of a magnetic material was referred to, and, for the sake of clarity, in these structures the resistivity, ($\rho_{m1}$) is approximately of the order of $10^5$ ohm cm. or less, while in the structures subsequently described wherein metallic magnetic material having a low resistivity is referred to, what is meant is a material having an approximate resistivity ($\rho_{m2}$), of 55 micro-ohm-cm. or less, however these values should not be considered limiting.

It has been found when low resistivity magnetic material ($\rho_{m2}$), such as the metallic tape type is utilized, that by use of probes positioned on the surface of the material, without the necessity the electrodes described above, flux changes which take place within this metallic magnetic material may be sensed. Further, the utilization of an electrode coating on one side of this metallic magnetic material may also be incorporated to provide sophistication in sensing techniques.

In particular, with reference to the FIGS. *5a* and *5b*, a side view of a toroidal core 40 is shown made of metallic magnetic material having a probe 42 on one face and a probe 44 on the opposite face, which probes are arranged in a line perpendicular with the faces of the core. Means for causing a flux change within the material is not shown for reasons which will become clear in the description to follow, and suffice it to say that when a flux change does take place and switches the direction of flux in the magnetic circuit described by the toroid 40, a potential difference appears across the probes 42 and 44. The FIG. *5b* illustrates an equivalent winding configuration as described by the probes 42 and 44 in relation with the core 40, and, in effect shows that a winding 42'–44' links part of the magnetic circuit of the core 40'. It should further be pointed out that in this embodiment and those to follow wherein a metallic magnetic material is utilized, the thickness of the material ($h$) is assumed to be much smaller than any surface dimension, while the resistivity of the magnetic material ($\rho_{m2}$) is much greater than the resistvity of the base material ($\rho_b$) which base material is utilized for the coatings making up the electrodes. Further, it should be understood that in order to simply demonstrate this invention and the different embodiments disclosed, a toroidal structure has been shown and such structures should not be considered limiting since the techniques described may work equally well with cusp shaped cores, bars and multipath structures. The structure disclosed in FIG. *5a* shows that the probes 42 and 44, may be moved across the surface of the core 40 in a continuous manner to determine the flux charge in any arbitrary portion of the structure without requiring a hole through the body of the core as is shown in the equivalent winding configuration in FIG. *5b*.

Figure 6:
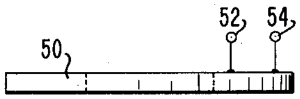
Figure 7A:
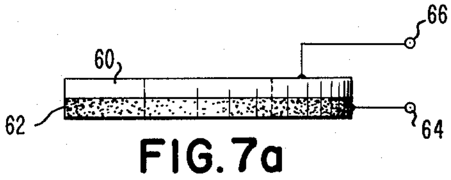
Figure 7B:
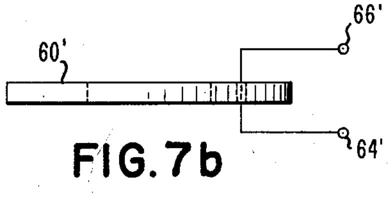
Figure 7C:
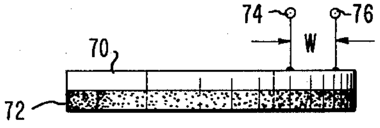
Figure 7D:
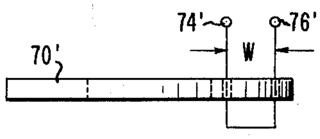

Referring to the FIG. 6, a toroidal core 50 is shown similar to the core 40 in FIG. *5a*, with a pair of electrodes 52 and 54 located on the same surface of the core 50. The probes 52 and 54 are adapted to sense flux changes which take place in the core 50 and may be placed at any distance relative to one another in a radial direction, and such a structure has no direct equivalent winding configuration as is shown in the FIG. *5b* for the structure of FIG. *5a*.

Referring to the FIGS. *7a* and *7b*, a metallic magnetic toroidal core 60 is provided with an electrode 62 of very low resistivity ($\rho_b$), such as copper, on one surface and a pair of probes 64 and 66, wherein the probe 64 is connected to the electrode 62 and the probe 66 is connected to the surface of the core 60. The equivalent winding configuration of this arrangement is shown in the FIG. *7b*, which arrangement allows sensing of any flux change taking place within that portion of the path linked by the coating 62 and the probe 66. It should be noted that the equivalent winding configurations shown in the FIGS. *5b* and *7b* are similar and the difference in structure resides in the provision of the base electrode coating 62 in the FIG. *7a*. The structure of FIG. *7a* has the advantage of using a "ground" coating on one side of the core 60 and probing on the other surface, so that the thin wafer like magnetic material which makes up the core 60 may be firmly supported on the one side.

The advantage of utilizing a "ground" coating is also shown in the FIG. *7c*, wherein a metallic tape wafer core 70, is provided having an electrode coating 72 on one surface and having a pair of probes 74 and 76 connected to the opposite surface of the core 70 in a radial arrangement. The FIG. *7d* illustrates the equivalent winding configuration for the structure of FIG. *7c*, and shows that a winding 74'–76' encloses the area designated as "*w*," also shown between the probes 74 and 76 in the FIG. *7c*. Thus any flux change which takes place within the area designated by "*w*" in the FIGS. *7c* and *7d* will be sensed by the probes 74 and 76.

Means for causing a flux change within the structures illustrated in the FIGS. *5a*, 6, *7a* and *7c*, described above, were neither shown nor described, but for those skilled in the art, an apparent method is to provide a signal winding which links the magnetic circuit described by the toroid, which, upon energization, accomplishes this result. However, it has been found that electrodes may also be utilized in combination with metallic magnetic material and the like to cause flux changes within the material and this novel flux switching means may be best understood by considering the structures subsequently shown and described.

Figure 8A:
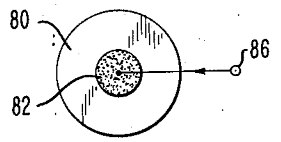
Figure 8C:
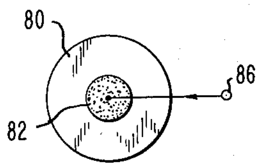

In the FIGS. *8a, 8b, 8c, 8d, 8e* and *8f*, a circular piece of metallic magnetic material 80 is shown, having central portion 82 which is an electrode coating of very low resistivity base material ($\rho_b$), on the upper face. In the FIGS. 8a and 8b this central portion electrode coating 82 is duplicated on the lower face of the material 80 as shown by an electrode 84, a probe 86 is connected to the electrode 82 and a probe 88 is connected to the electrode 84. In the FIGS. 8c and 8d, substantially the same structure as illustrated in the FIGS. 8a and 8b is shown with the exception of the electrode 84 on lower face of the material 80, which is shown as an electrode coating covering the entire lower face and is primed to designate this difference (84'). In the FIGS. 8e and 8f the equivalent winding configuration for the structures illustrated in the FIGS, 8a, 8b, 8c and 8d is shown with a circular metallic magnetic material 80' having central portion 82', appearing as an aperture, and a winding 86'–88' linking the structure. A signal impressed on the winding 86'–88' causes a flux change in the material 80' and may be thought of as a toroidal magnetic core having a signal winding inductively linked thereto. Similarly, a signal impressed upon the probes 86 and 88 causes a flux change in the material 80 in the FIGS. 8a, 8b, 8c and 8d and it should be noted that the equivalent hole 82' has the same dimensions as the central electrode 82 in each of the structures shown, even though the electrodes 84 and 84' in the FIGS. 8b and 8d respectively differ in dimensions. When this material 80 is fabricated of magnetic material capable of attaining bistable states of residual magnetization, commonly known in the art as "rectangular loop" material, adaptations of these structures to memory cells becomes apparent. One may readily envision a magnetic device which combines the features illustrated in the structures of FIGS. 5a through 7d with the structures illustrated in FIGS. 8a through 8d. Such a structure, for instance, would then obviate the necessity of apertures in a memory cell with windings threaded therein for sensing or driving techniques.

Figure 9A:
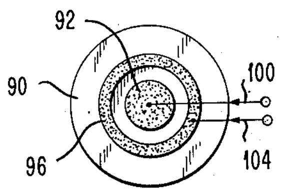
Figure 9C:
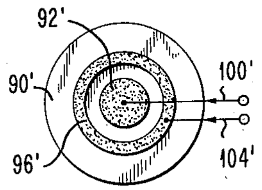

Considering the structures as memory cells, the desirability of coincident current selection has been described in the prior art for use in storage matrices. In this respect, consider the structures illustrated in FIGS. 9a, 9b, 9c, 9d, 9e and 9f. In the FIGS. 9a and 9b, a circular disc shaped sheet of metallic magnetic material 90 capable of attaining bistable states of residual flux density is shown having electrodes 92 and 94 centrally located on the upper and lower faces, respectively, a pair of ring shaped electrodes 96 and 98, surrounding the electrodes 92 and 94, respectively, a pair of probes 100 and 102 connected to the electrodes 92 and 94, respectively, and a further pair of probes 104 and 106 connected to the electrode rings 96 and 98, respectively. In the FIGS. 9c and 9d, the same structure as illustrated in the FIGS. 9a and 9b is shown with the similar parts numbered the same and primed, except for the electrode 108 which is a "ground" coating completely covering the lower face of the structure 90'. In each of the structures shown in FIGS. 9b and 9d, a current directed into the probe 100 or 100' passes through the probe, the electrode 92 or 92', the magnetic material 90 or 90' defined by the electrodes 92 or 92', through the electrodes 94 or 108 and the probe 102 or to ground, which is similar to energizing, in the equivalent winding configuration of a toroidal magnetic core 90" shown in FIGS. 9e and 9f having a central aperture 96" and a pair of drive lines 100" and 104", the drive line 100". This drive is regulated so that it is insufficient to cause flux reversal in the disc 90, 90' or in the equivalent winding configuration 90". Upon coincidentally directing current into the probe 104, 104' or the line 104" the drive is then sufficient to cause switching of flux within the magnetic material disc 90, 90' or 90". It should be noted that the equivalent hole 96" in the core 90" of FIGS. 9e and 9f is defined by the outer edge of the electrodes 96 or 96' in the FIGS. 9a, 9b, 9c or 9d and that the difference of electrode coatings 94 and 108 on the lower face of the disc 90 and 90' does not alter the area of the equivalent hole 96".

Figure 8E:
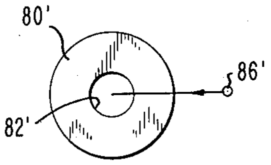
Figure 8B:
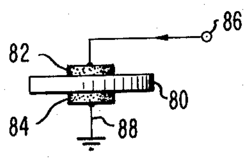
Figure 8D:
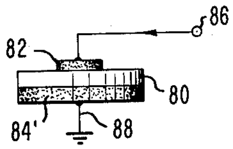
Figure 8F:
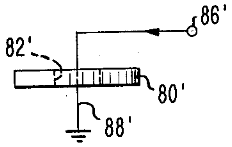
Figure 9E:
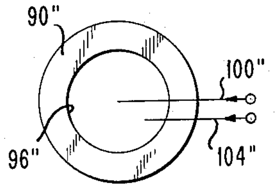
Figure 9B:
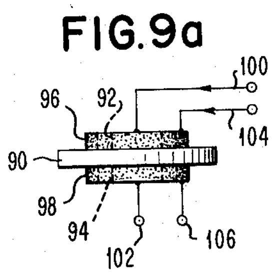
Figure 9D:
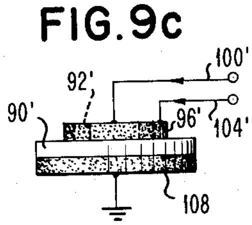
Figure 9F:
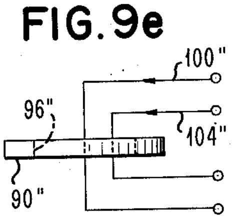

Considering the aforegoing structures as set forth, it may be determined, with reference to the equivalent winding configurations shown in FIGS. 8e and 8f, and in the FIGS. 9e and 9f that the area in which flux switching takes place is defined by the outer edges of the circular magnetic material. If a plurality of such devices were to be fabricated on a continuous sheet of metallic magnetic material and this type of driving technique were utilized, again as in former apertured plate memory arrays, the drive would have to be strictly limited to prevented excess flux leakage to adjacent cells. However, with a simple modification, these type structures may be made to confine the magnetic circuit and eliminate stray flux leakage.

Figure 10A:
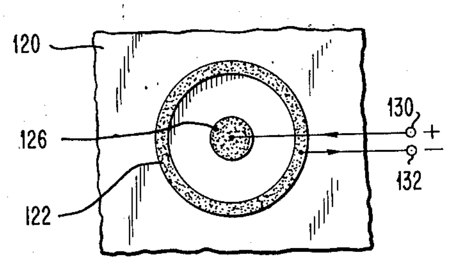
Figure 10B:
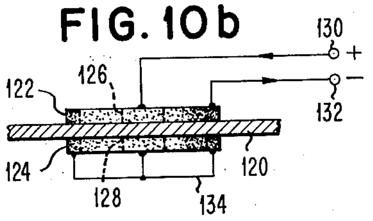
Figure 11:
FIG. 11 illustrates the field, H, as applied to the cell of FIGS. 10*a* and 10*b*.

With reference to the FIGS. 10a and 10b, a sheet of metallic wafer thin magnetic material 120 having a substantially rectangular hysteresis characteristic is shown with a pair of coinciding ring shaped electrode coatings 122 and 124 on either side of the sheet 120 and a pair of coinciding circular electrode coatings 126 and 128 centrally located within the rings 122 and 124. For the sake of clarity and ease, a central coating portion similar to the electrode 126 shall hereinafter be referred to as a "button," while the ring like coating similar to the electrode 122 will hereinafter be referred to as a "ring." It is also understood that these buttons and rings are coatings of very low resistivity base material, such as silver or copper. A probe 130 is connected to the button 126 and a probe 132 is connected to the ring 122. The bottom electrodes, the button 128 and the ring 124, are shorted together externally by means of a shorting wire 134. Upon application of a current into the probe 130, current travels through the button 126, an area of the material 120 defined by the area of the button 126, the button 128, the shorting wire 134, the ring 124, an area of the material 120 defined by the area of the ring 122, the ring 122 and the probe 132. Considering the applied field when such a current is impressed, the FIG. 11 illustrates a profile of the field intensity H, along a cross-sectional diameter passing through the center of the structure of FIG. 10a and 10b, and, about the center of the button area, 126 and 128, the field intensity is zero and rises sharply in the area immediately adjacent the buttons 126 and 128 and then starts to decline in a cusp like curve until reaching the area defined by the rings 122 and 124, to then decline sharply to zero. Thus on either sides of the buttons 126 and 128 a field is impressed, which field diminishes to zero in the ring area 122 and 124. We may then consider the area of material 120 intermediate the buttons 126, 128 and the rings 122, 124 as an isolated magnetic circuit with no flux leakage outside the ring 122, 124. Thus the magnetic circuit is here defined by the applied magnetic field and is actively isolated.

Figure 12:
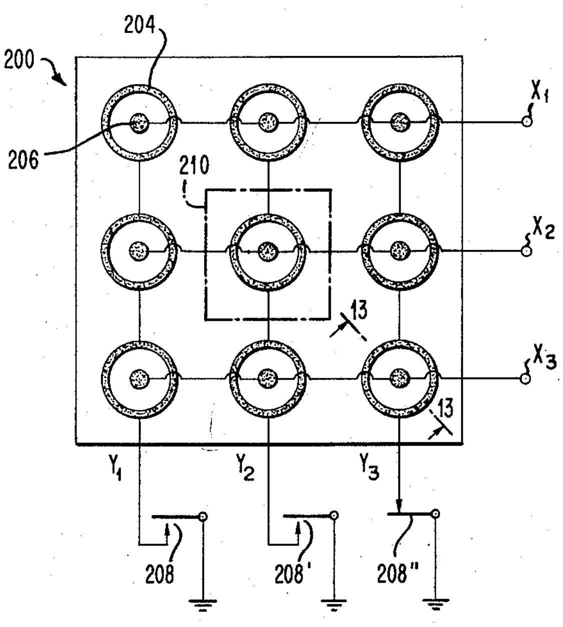
FIG. 12 illustrates a two-dimensional memory matrix in accordance with this invention.

An illustration of how the storage cell shown in the FIGS. 10a and 10b might be utilized in a two dimensional memory array in which active isolation of applied magnetic fields may be accomplished, is shown in the FIG. 12. Referring to the FIG. 12, a sheet 200 of wafer thin metallic magnetic material having a rectangular hysteresis characteristic is shown with a plurality of rings 204 and buttons 206 making up storage cells as described above in FIGS. 10a and 10b, which are arranged in columns and rows, with a number of drive lines, $X_1$, $X_2$, and $X_3$ connected with the buttons 206 in each row, and a number of lines $Y_1$, $Y_2$ and $Y_3$ connected with rings 204 in each column through a number of switches 208, 208' and 208", respectively, and thence to ground. Selection of a storage cell labeled 210 is accomplished by closure of the switch 208' and energization of the line $X_2$. The current then travels through the line $X_2$ to the button 206 in the cell 210, through the button, as described above for the FIGS. 10a and 10b, through the material 120, through a shorting wire, not shown, through a further ring on the under side of the sheet 200, not shown, through the material 120 again, to the electrode ring 204 of the cell 210, the wire $Y_2$, the closed switch 208' and thence to ground.

Figure 13:
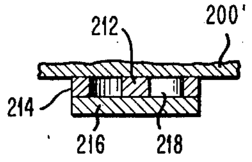
FIG. 13 is a sectional view of a memory cell and illustrates how each of the memory cells shown in the FIG. 12 may be fabricated.

When a plane of such memory cells are arranged, as described above, the lower face of each cell could be fabricated as is shown in the FIG. 13, which illustrates a sheet 200', a button 212, and a ring 214 arranged in accordance with the cell of FIGS. 10*a* and 10*b*, but instead of a shorting wire, a connecting disc 216 of very low resistivity ($\rho_b$) base material is utilized which shorts the button 212 and the ring 214. In such an arrangement, the electrodes 212 and 214 may be fabricated of copper while the disc 216 may be silver paint. It should be pointed out that an area 218 is provided by such an arrangement which acts as an insulator. Such a space as provided by the area 218 may be filled with insulating material to insure isolation.

Figure 14:
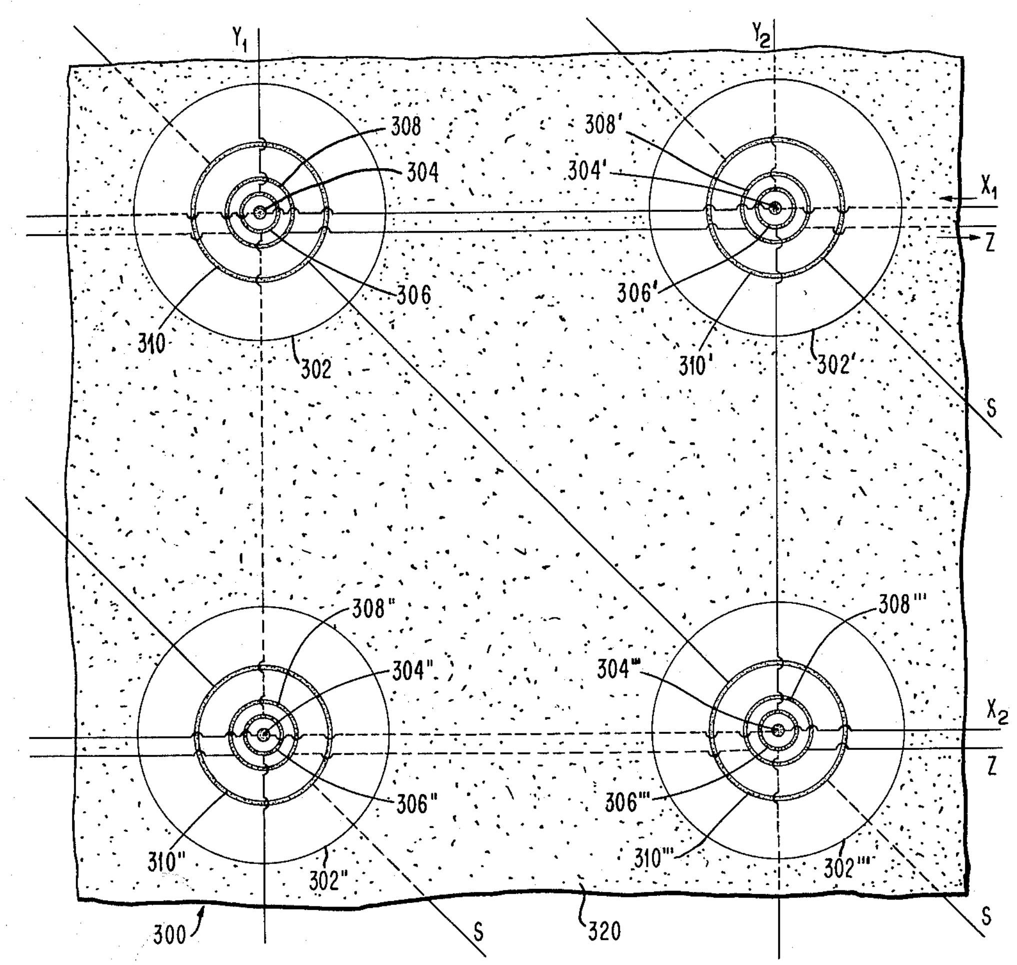
FIG. 14 illustrates a three-dimensional memory matrix is accordance with another embodiment of this invention.

Another way in which a memory array may be fabricated in accordance with this invention is shown in FIG. 14, which illustrates a fragmentary part of the top view of one plane of a three-dimensional memory array in which each memory cell is passively isolated. Referring to the FIG. 14 a sheet of metallic magnetic material 300, having a rectangular hysteresis loop characteristic is shown whereon a plurality of storage cells, defined by the boundaries 302, are arranged in columns and rows, each of which has a button 304, a first ring 306 about the button 304, a second ring 308 about the first ring 306, and a third ring 310 about the second ring 308. Connected to the button 304 and 304' is a row selection drive line $X_1$, and connected to the buttons 304'' and 304''' is a row selection drive line $X_2$, which drive lines, $X_1$, and $X_2$ are adapted to deliver, when energized, a half select pulse, $Ho/2$, where $Ho$ is the applied field necessary to switch the material within the magnetic circuit from one stable state of flux density to another. Connected to the first rings 306 and 306'' is a column selection drive line $Y_1$, while connected to the first rings 306' and 306''' is a second column selection drive line $Y_2$, which drive lines, $Y_1$ and $Y_2$, are also adapted to deliver a half select pulse, $Ho/2$, when energized. Connected with each of the second rings 308 is an inhibit plane drive line Z, which is adapted to apply a field to each of the storage cells defined by the boundaries 302, a field which is in opposition to the selection field applied upon energization of any combination of the column and row drive lines in that plane, and connected with each of the third rings 310 is a plane sense line S, adapted to sense a flux change in any of the plane storage cells.

Assume, in the FIG. 14, the cell defined by the boundary 302' is selected to store information. The drive lines $X_1$ and $Y_2$ would then be energized, and in operation appears as the cell described and illustrated in FIGS. 9*a*–9*f*. As was previously described, with reference to the FIGS. 9*e* and 9*f* showing the equivalent winding configuration, the magnetic circuit is defined by the outer edges of the cell, here however, in the FIG. 14, there is a continuous sheet of magnetic material 300 comparable to the material 90 in the FIGS. 9. The field set up by the coincident pulsing of the $X_1$ and the $Y_2$ drive lines permeates radially from the first ring 306', switching the flux in a larger and larger concentric area about the ring 306', limited only by the total applied field. Assume the field applied is great enough to cause flux switching in an unlimited area about the ring 306'. To enhance restriction of flux change to the boundry region 302 which boundry defines each of the storage cells, the sheet 300 may have a plating of copper 320 on both sides on all that area which is external to the boundries 302 of the storage cells. This plating effectively provides an area of greater conductivity surrounding each cell 302 and may be considered as a shorted turn on all of the external region minimizing any flux change therein due to the resulting large eddy currents. Thus the eddy current shielding isolates one storage cell from another. The cross-sectional area of the magnetic circuit in the storage cell selected is then defined by a radial line intermediate the boundry region 302' and the first ring 306'. Sensing the flux change taking place within the cell defined by 302' is then accomplished by utilization of the electrode ring 310' which is centrally located within the magnetic circuit, a clearer understanding of which may be had by reference to the equivalent winding configuration shown in FIGS. 5*b* and 7*b*. Assuming that we desire to inhibit switching of any memory cells in the plane, the Z drive line would be energized simultaneously with energization of the X and Y selection drive lines. Assuming the cell defined by the boundry 302' were selected, then the current in the Z drive line enters the third ring 308' to set up an applied magnetic field in opposition to the selection field inhibiting flux switching in the cell.

In considering the detailed description above, it should be kept in mind that what have been described are preferred embodiments, and in each instance the electrode coatings on either side of a structure need not be aligned in order to function, since unaligned coatings, or probes, will drive or sense flux changes in each of the structures but will increase the impedance value of a load or utility circuit connected therewith. Further, it is emphasized that any part or all of the flux changes may be sensed in a magnetic path by proper positioning of the electrodes or probes.

Accordingly, while there have been described and pointed out the fundamental novel features of the invention as applied to preferred embodiments, it will be understood that various omissions and substitutions and changes in the form of details of the devices illustrated may be made by those skilled in the art without departing from the spirit of the invention. It is our intention therefore, to be limited only as indicated by the following claims.

What is claimed is:

1. In combination with a magnetic device comprising a member made of low resistivity metallic magnetic material of given conductivity capable of attaining bistable states of residual flux density, means inductively associated with said member for inducing a flux change therein, and a pair of electrode probe means in ohmic contact with said member exhibiting a high conductivity relative to the given conductivity of said member for sensing flux changes in said member.

2. A device as set forth in claim 1, wherein said member is a sheet and said pair of electrode probe means are positioned on one side only of said sheet.

3. A device as set forth in claim 1 wherein said member is a sheet and said pair of electrode probe means are positioned on either side of said sheet.

4. A device as set forth in claim 3, wherein said pair of electrode probe means have a pair of probes in alignment.

5. A magnetic device as set forth in claim 1 wherein said member includes a plurality of apertures and said flux inducing means includes drive lines for producing flux changes about each of said apertures.

6. A magnetic device comprising a member made of metallic magnetic material of given conductivity and capable of attaining bistable states of residual flux density, a first pair of aligned electrodes centrally located on either side of said member, a second pair of aligned electrodes on either side of said member separated from and circumferentially surrounding said first pair of electrodes, said pairs of electrodes made of higher conductivity material relative to said given conductivity and responsive to coincident energization thereof to switch the material in a path defined by the magnetic material surrounding said second electrode coating from one to another of said stable states, and sensing means comprising a further pair of electrodes made of said relatively higher conductivity material positioned on said member removed from said first and second pairs of electrodes and within said path for providing an output signal in response to the change in said material.

7. In a magnetic memory array, a memory plane comprising a sheet of metallic magnetic material capable of attaining bistable states of residual flux density and having defined individual storage cell portions arranged in columns and rows, both sides of said sheet having conductive coatings thereon in those areas beyond said defined portions, each of said cell portions comprising an aligned pair of electrode buttons positioned on either side of said sheet and centrally located within said portion, an aligned pair of first ring electrodes positioned on either side of said sheet removed from and circumferentially surrounding said buttons, and an aligned pair of second ring electrodes on either side of said sheet removed from and circumferentially surrounding said first ring electrodes, means for causing said cells to switch from one bistable state to another including row conductors connected with the buttons for the cells in each row and column conductors connected with the first rings for the cells in each column, and means for sensing a change in the state of said cells including a sense conductor connected with the second rings in each of said cells.

8. An array as set forth in claim 7 including means for inhibiting a flux change in said cells including, in each said cell, an aligned pair of third ring electrodes positioned on either side of said sheet removed from and intermediate said first and second ring electrodes.

9. A magnetic binary memory plane wherein each binary has a defined flux path comprising, a sheet of metallic magnetic material of given conductivity capable of attaining bistable states of residual flux density having a plurality of portions, each of said portions adapted to define a magnetic path for one of said binaries, means inductively associated with said magnetic sheet for inducing a flux change in each of said portions and a pair of electrode probe means in ohmic contact with said sheet exhibiting a high conductivity relative to the given conductivity of said sheet for sensing flux changes in said sheet.

10. A magnetic binary memory plane as set forth in claim 9 further comprising means including a second sheet of material of increased conductivity relative to said given conductivity and having a plurality of apertures therein disposed in ohmic contact with said magnetic sheet so as to surround each of said portions for confining flux in said paths.

11. A magnetic binary memory plane as set forth in claim 9 wherein each of said plurality of portions of said magnetic sheet has an aperture therethrough and said pair of electrode probe means includes a coating having a higher conductivity than said given conductivity circumferentially surrounding each of said apertures.

12. In a circuit comprising, a magnetic element made of metallic magnetic material of given canductivity and capable of attaining different stable states of residual flux density, means coupling said element for inducing a flux change therein, and a pair of separated electrode means made of material exhibiting a higher conductivity relative to said element and being in ohmic contact with said element for sensing said flux change.

References Cited in the file of this patent

UNITED STATES PATENTS

| | | |
|---|---|---|
| 2,863,712 | Potter | Dec. 9, 1958 |
| 2,882,519 | Walentine et al. | Apr. 14, 1959 |
| 2,890,441 | Duinker | June 9, 1959 |
| 2,900,451 | Havstad | Aug. 18, 1959 |
| 2,942,240 | Rajchman et al. | June 21, 1960 |
| 2,951,121 | Conrad | Aug. 30, 1960 |
| 2,987,707 | Fuller et al. | June 6, 1961 |
| 3,030,612 | Rubens et al. | Apr. 17, 1962 |
| 3,083,353 | Bobeck | Mar. 26, 1963 |

FOREIGN PATENTS

| | | |
|---|---|---|
| 1,138,785 | France | June 19, 1957 |

OTHER REFERENCES

Publication I: An article entitled, "The Nondestructive Read-Out of Magnetic Cores," by A. Papoulis, appearing on pages 1283–1288 of the "Proceedings of the IRE," published August 1954, #41.

Publication II: An article entitled, "A New Nondestructive Sensing of Magnetic Cores," by D. A. Buck and W. I. Frank, appearing on pages 822–830 of "Communications and Electronics," January 1954.

Publication III: Electronics, pp. 194–197, March 1955, #45.

Publication IV: The Bell System Technical Journal, vol. 36, No. 6, pages 1319 to 1340, November 1957.